US012705040B2

(12) United States Patent
Feldman et al.

(10) Patent No.: US 12,705,040 B2
(45) Date of Patent: Aug. 11, 2026

(54) UPGRADING AN EXISTING STANDARD ELECTRIC VEHICLE (EV) CHARGER FROM GRID TO VEHICLE (V1G) TO V1G PLUS VEHICLE TO GRID (V2G) OPERATION

(71) Applicant: Siemens Industry, Inc., Alpharetta, GA (US)

(72) Inventors: Daniel Feldman, New York, NY (US); John R. DeBoer, III, Denver, CO (US)

(73) Assignee: Siemens Industry, Inc., Alpharetta, GA (US)

( * ) Notice: Subject to any disclaimer, the term of this patent is extended or adjusted under 35 U.S.C. 154(b) by 531 days.

(21) Appl. No.: 18/068,963

(22) Filed: Dec. 20, 2022

(65) Prior Publication Data

US 2024/0201974 A1 Jun. 20, 2024

(51) Int. Cl.

| | |
|---|---|
| ***G06F 9/445*** | (2018.01) |
| ***B60L 53/00*** | (2019.01) |
| ***B60L 55/00*** | (2019.01) |
| ***G06F 8/65*** | (2018.01) |
| ***G06F 21/31*** | (2013.01) |
| ***G06F 21/62*** | (2013.01) |

(52) U.S. Cl.
CPC ................ *G06F 8/65* (2013.01); *B60L 53/00* (2019.02); *B60L 55/00* (2019.02); *G06F 21/31* (2013.01); *G06F 21/629* (2013.01)

(58) Field of Classification Search
CPC .......... G06F 8/65; G06F 21/31; G06F 21/629; B60L 53/00; B60L 55/00
See application file for complete search history.

(56) References Cited

U.S. PATENT DOCUMENTS

2021/0094437 A1* 4/2021 Tsubokura .............. B60L 50/50
2021/0213848 A1* 7/2021 Sun ........................ B60L 53/66

FOREIGN PATENT DOCUMENTS

KR 20210001181 A 1/2021

OTHER PUBLICATIONS

"Road vehicles—Vehicle to gridcommunication interface—Part 1: General information and use-case definition."; ISO 15118-1:2019; published: Apr. 2, 2019; pp. 1-117; XP082044161.

* cited by examiner

*Primary Examiner* — Chuck O Kendall

(57) ABSTRACT

A system and a method to upgrade an existing standard Electric Vehicle (EV) charger from Grid to EV (V1G) to Vehicle to Grid (V2G) in order to send power from a grid to an EV as well as from the EV to the grid. The method comprises loading the existing standard EV charger initially developed to support only V1G with a V2G compatible firmware. The method further comprises locally configuring the existing standard EV charger for V2G operation to locally enable the existing standard EV charger to allow V2G functionality after an inspection such that the existing standard EV charger supports a V2G communication interface for bi-directional charging/discharging of electric vehicles (EVs). A local configuration requires an authorization via a cloud for conversion of the existing standard EV charger from V1G to V2G.

15 Claims, 3 Drawing Sheets

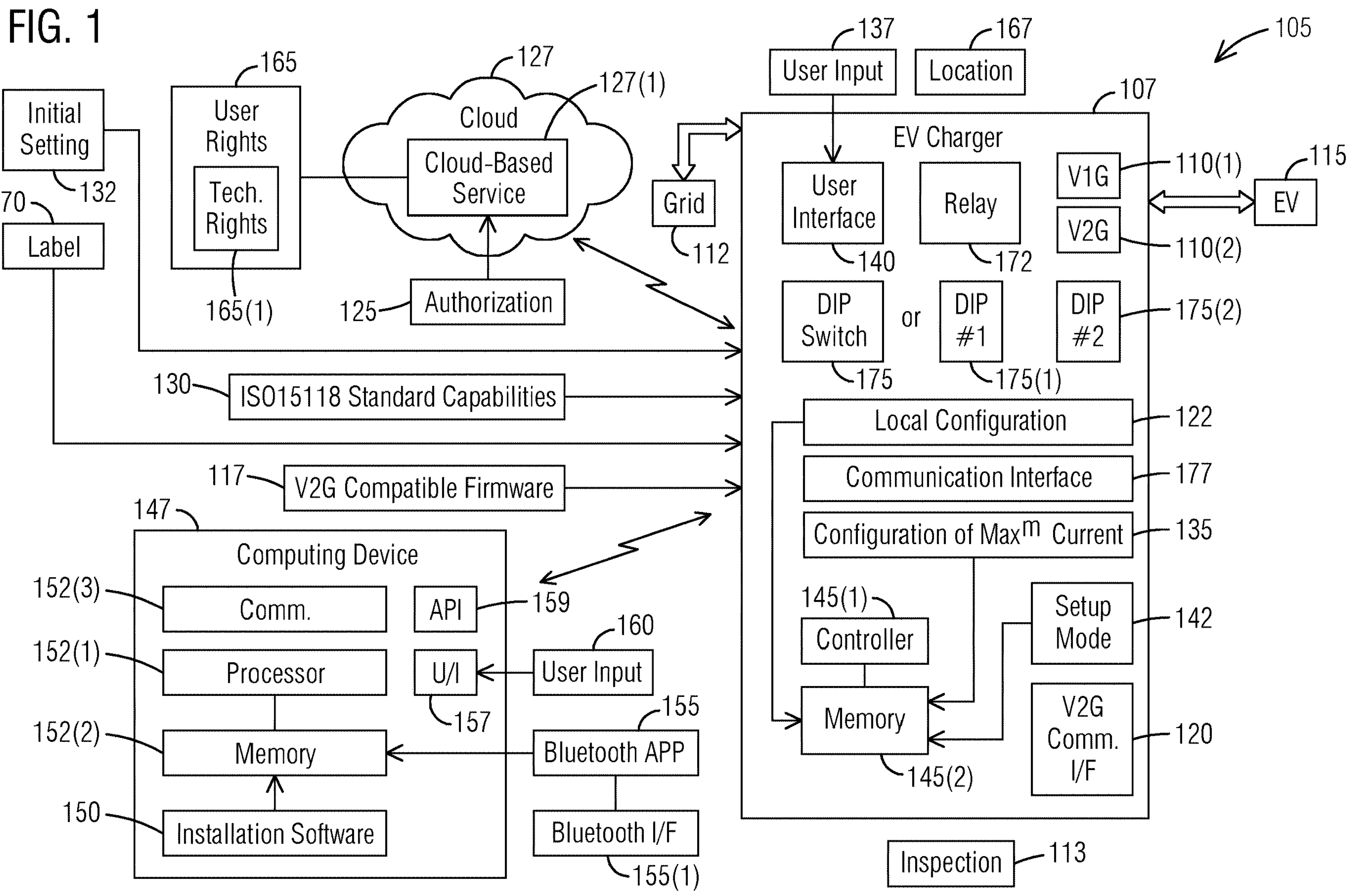
FIG. 1
105
Initial Setting
132
170
Label
165
User Rights
Tech. Rights
165(1)
127
Cloud
127(1)
Cloud-Based Service
125
Authorization
Grid
112
137
User Input
167
Location
107
EV Charger
User Interface
140
Relay
172
V1G
110(1)
V2G
110(2)
EV
115
DIP Switch
175
or
DIP #1
175(1)
DIP #2
175(2)
130
ISO15118 Standard Capabilities
Local Configuration
122
Communication Interface
177
117
V2G Compatible Firmware
Configuration of Max^m Current
135
147
Computing Device
152(3)
Comm.
API
159
160
User Input
152(1)
Processor
U/I
157
155
Bluetooth APP
152(2)
Memory
150
Installation Software
Bluetooth I/F
155(1)
145(1)
Controller
Setup Mode
142
Memory
145(2)
V2G Comm. I/F
120
Inspection
113

Figures 2, 3:
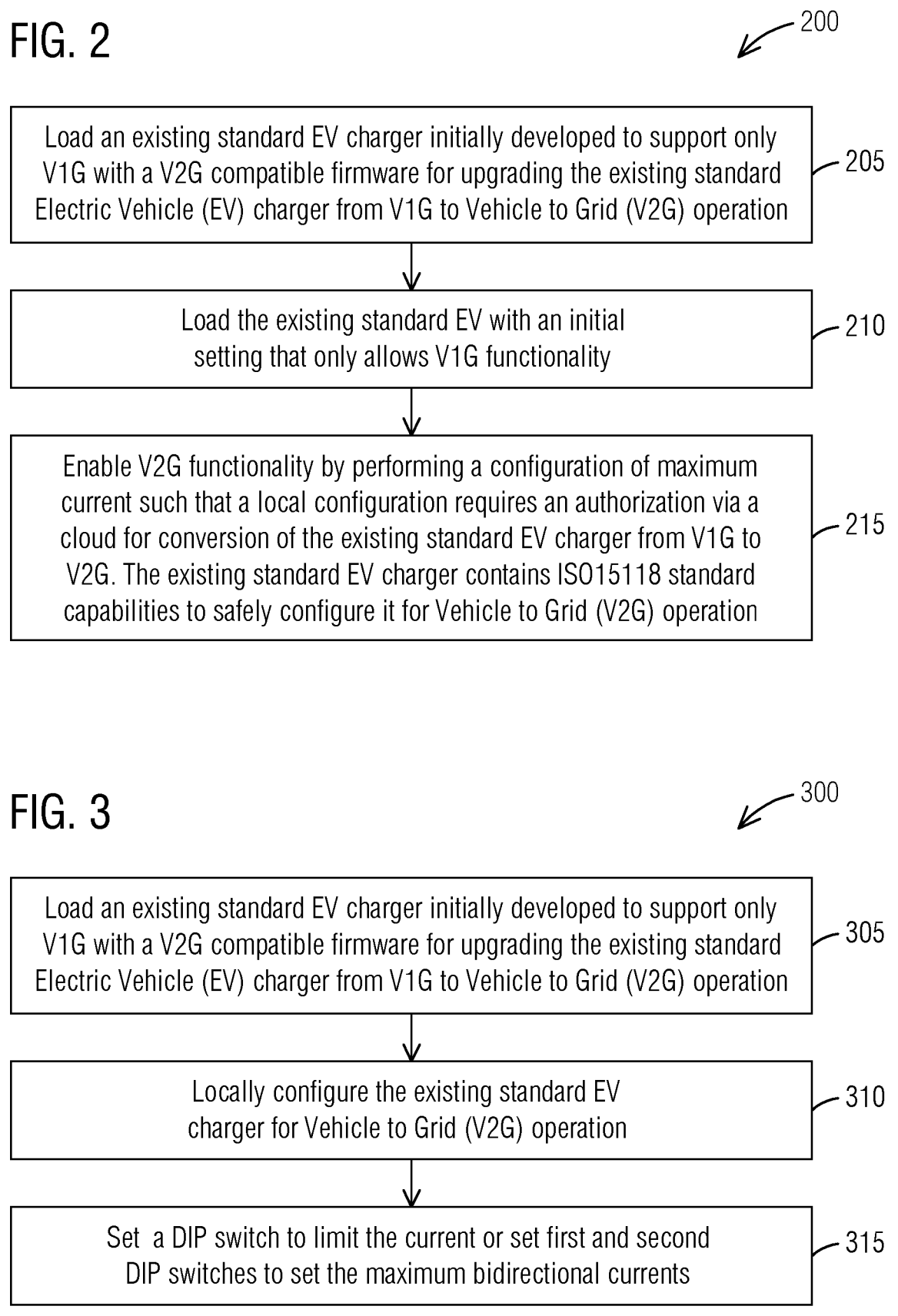

Load an existing standard EV charger initially developed to support only V1G with a V2G compatible firmware for upgrading the existing standard Electric Vehicle (EV) charger from V1G to Vehicle to Grid (V2G) operation — 205

Load the existing standard EV with an initial setting that only allows V1G functionality — 210

Enable V2G functionality by performing a configuration of maximum current such that a local configuration requires an authorization via a cloud for conversion of the existing standard EV charger from V1G to V2G. The existing standard EV charger contains ISO15118 standard capabilities to safely configure it for Vehicle to Grid (V2G) operation — 215

Load an existing standard EV charger initially developed to support only V1G with a V2G compatible firmware for upgrading the existing standard Electric Vehicle (EV) charger from V1G to Vehicle to Grid (V2G) operation — 305

Locally configure the existing standard EV charger for Vehicle to Grid (V2G) operation — 310

Set a DIP switch to limit the current or set first and second DIP switches to set the maximum bidirectional currents — 315

Figures 4, 5:
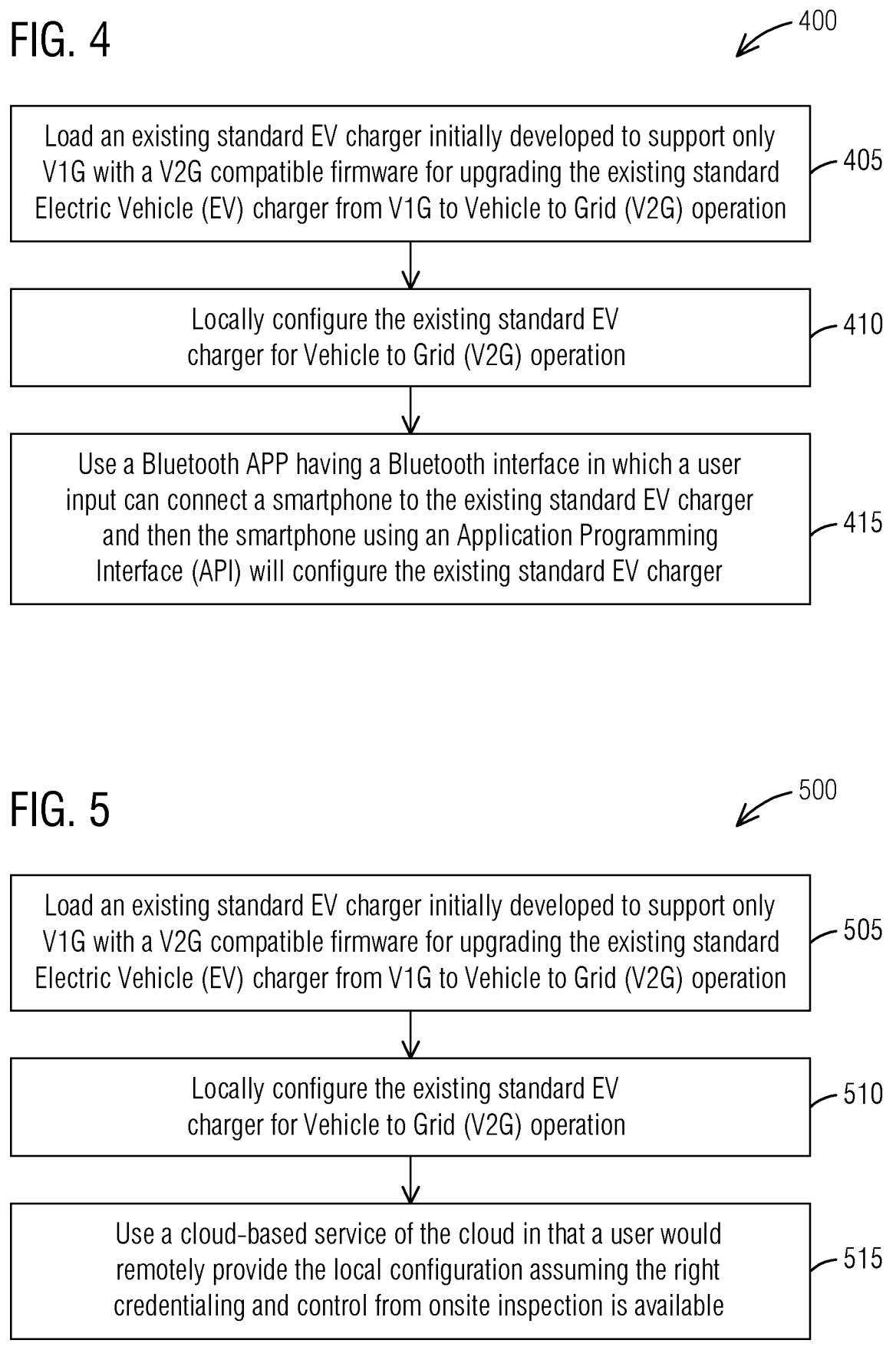

Load an existing standard EV charger initially developed to support only V1G with a V2G compatible firmware for upgrading the existing standard Electric Vehicle (EV) charger from V1G to Vehicle to Grid (V2G) operation — 405

Locally configure the existing standard EV charger for Vehicle to Grid (V2G) operation — 410

Use a Bluetooth APP having a Bluetooth interface in which a user input can connect a smartphone to the existing standard EV charger and then the smartphone using an Application Programming Interface (API) will configure the existing standard EV charger — 415

Load an existing standard EV charger initially developed to support only V1G with a V2G compatible firmware for upgrading the existing standard Electric Vehicle (EV) charger from V1G to Vehicle to Grid (V2G) operation — 505

Locally configure the existing standard EV charger for Vehicle to Grid (V2G) operation — 510

Use a cloud-based service of the cloud in that a user would remotely provide the local configuration assuming the right credentialing and control from onsite inspection is available — 515

UPGRADING AN EXISTING STANDARD ELECTRIC VEHICLE (EV) CHARGER FROM GRID TO VEHICLE (V1G) TO V1G PLUS VEHICLE TO GRID (V2G) OPERATION

BACKGROUND

1. Field

Aspects of the present invention generally relate to a system and a method to upgrade an existing standard Electric Vehicle (EV) charger from Grid to Vehicle (V1G) to Vehicle to Grid (V2G) operation.

2. Description of the Related Art

Unlike gas-powered vehicles, electric vehicles (EVs) do not require internal combustion engines to operate. Outfitted with an electric motor and a rechargeable battery pack, EVs move along our roadways without burning up gasoline, or producing harmful exhaust emissions, while generating less noise pollution. The world of transportation continues to rapidly evolve. Sales of electric vehicles (EVs) are expected to expand rapidly in the US in the coming years. Economics aside, there are growing social and political initiatives toward "clean" energy that will push this to become reality. A number of market forecasts indicate electric vehicles will account for nearly 1 in 5 of all vehicles sold within the next 10 years. It is estimated approximately 3 million EVs will be sold in the US in 2028. A rule of thumb by industry analysts is there need be on the order of 20 public EVC stations per EV on the road to support the ecosystem. There were just over 60,000 charging stations in the US at the end of 2019. Thus, tens of thousands will need to be deployed every year for some time as the market grows.

Charging stations have provided hundreds of millions of charges to EV (electric vehicle) drivers worldwide. When it comes to electric vehicles, the converter is built inside the car. It's called the "onboard charger" though it really is a converter. It converts power from AC to DC and then feeds it into the car's battery. This is the most common charging method for electric vehicles today and most chargers use AC power.

An EV is connected to AC power, 120V or 240V, and a battery charger in the EV converts the AC power to the DC needed to charge the battery and controls the charging process. In DCFC the DCFC converts the AC power to DC and the DC power is sent directly to the EV battery bypassing the onboard battery charger. There are three categories or types of charging: Trickle Charge, AC Charge and DC Charge. Most drivers of electric vehicles (EVs)—which include all-electric vehicles and plug-in hybrid electric vehicles (PHEVs)—charge their vehicles overnight at home using AC Level 1 or AC Level 2 charging equipment.

A charging station, also known as a charge point or electric vehicle supply equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC fast chargers. Batteries can only be charged with direct current (DC) electric power, while most electricity is delivered from the power grid as alternating current (AC). For this reason, most electric vehicles have an onboard charger with an AC-to-DC converter (a rectifier). At an AC charging station, power is supplied to the onboard charger.

In principle, any AC level 2 EV charger that supports the ISO15118 standard has all the hardware capabilities to send power from the grid to a car, as well as from the car in the grid direction. However, due to the nature in which the neutral connection exists in buildings, these need to be inspected by an electrician before deciding whether what is the maximum safe current level that can be exported towards the grid. There is no way today to upgrade chargers from V1G to V2G, because there is no mechanism to locally enable the charger to allow V2G after an inspection. The existing option is to ship a charger preconfigured to work in V2G mode, and perform configuration of maximum current via a dip-switch during installation.

Therefore, there is a need for a method to configure existing standard AC chargers that contain ISO15118 capabilities to safely configure them for Vehicle to Grid (V2G) operation.

SUMMARY

Briefly described, aspects of the present invention relate to local configuration that requires authorization via the cloud and conversion of an EV charger from V1G to V2G. V1G involves varying the time/rate at which an electric vehicle is charged, while V2G also includes reverse power flow. V1G allows EVs to modify charging rates and time dynamically since it links the EV to the station using a data connection. V1G includes approaches such as charging vehicles in the middle of the day to absorb solar generation that would otherwise need to be shed, or varying the charge rate of electric vehicles to provide frequency response or load balancing services. V2G stands for "vehicle to grid" and is a technology that enables energy to be pushed back to the power grid from the battery of an electric car. Vehicle-to-grid (V2G), also known as Vehicle-to-home (V2H) or Vehicle-to-load (V2L) describes a system in which plug-in electric vehicles (PEV) sell demand response services to the grid. Demand services are either delivering electricity or by reducing their charging rate. Demand services reduce pressure on the grid, which might otherwise experience disruption from load variations. Plug-in electric vehicles include battery electric vehicles (BEV), plug-in hybrids (PHEV), and hydrogen vehicles. They share the ability to generate electricity. That electricity is typically used to power the vehicle. However, at any given time 95% of cars are parked, while their energy sits unused. V2G envisions sending some of the stored power to the grid (or reducing charge rates to pull less power from the grid). The invention describes a method to configure existing standard AC chargers that contain ISO15118 standard capabilities to safely configure them for Vehicle to Grid (V2G) operation. For example, an AC level 2 EV charger that supports the ISO15118 standard has all the hardware capabilities to send power from the grid to a car, as well as from the car in the grid direction. ISO15118 Road vehicles—Vehicle to grid communication interface is a proposed international standard defining a vehicle to grid (V2G) communication interface for bi-directional charging/discharging of electric vehicles. The standard provides multiple use cases like secure communication, smart charging and the plug and charge feature used by some electric vehicle networks.

In accordance with one illustrative embodiment of the present invention, a method to upgrade an existing standard AC Electric Vehicle (EV) charger from V1G functionality to Vehicle to Grid (V2G) operation is provided in order to send power from a grid to an EV as well as from the EV to the grid. The method comprises loading the existing standard AC EV charger initially developed to support only V1G with a V2G compatible firmware. The method further comprises locally configuring the existing standard AC EV charger for Vehicle to Grid (V2G) operation to locally enable the existing standard AC EV charger to allow V2G functionality after an inspection such that the existing standard AC EV charger supports a vehicle to grid (V2G) communication interface for bi-directional charging/discharging of electric vehicles (EVs). A local configuration requires an authorization via a cloud for conversion of the existing standard AC EV charger from V1G to V2G.

In accordance with one illustrative embodiment of the present invention, a method to upgrade an existing standard AC Electric Vehicle (EV) Level 2 charger from V1G functionality to Vehicle to Grid (V2G) operation in order to send power from a grid to an EV as well as from the EV to the grid. The method comprises loading the existing standard AC EV Level 2 charger initially developed to support only V1G functionality with a V2G compatible firmware. The method further comprises loading the existing standard AC EV Level 2 charger with an initial setting that only allows V1G functionality. The method further comprises enabling V2G functionality by performing a configuration of maximum current. A local configuration requires an authorization via a cloud for conversion of the existing standard AC EV Level 2 charger from V1G to V2G. The existing standard AC EV Level 2 charger contains ISO15118 standard capabilities to safely configure it for Vehicle to Grid (V2G) operation.

In accordance with one illustrative embodiment of the present invention, a method to upgrade an existing standard Electric Vehicle (EV) charger from to send power from a grid to an EV as well as from the EV to the grid. The method comprises loading the existing standard EV charger initially developed to support only a grid to an EV charging with the EV to the grid charging compatible firmware. The method further comprises locally configuring the existing standard EV charger for the EV to the grid charging operation to locally enable the existing standard EV charger to allow the EV to the grid charging such that the existing standard EV charger supports an EV to the grid charging communication interface for bi-directional charging/discharging of electric vehicles (EVs). A local configuration requires either an authorization via a cloud or configuring via a computing device having a Bluetooth application (APP) or setting of one or more DIP switches for conversion of the existing standard EV charger from the grid to the EV as well as from the EV to the grid.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 1 illustrates an electric vehicle (EV) charger upgrading system for upgrading an EV charger from V1G to Vehicle to Grid (V2G) operation in accordance with an exemplary embodiment of the present invention.

FIG. 2 illustrates a method for upgrading an existing standard Electric Vehicle (EV) charger from V1G to Vehicle to Grid (V2G) operation in accordance with an exemplary embodiment of the present invention.

FIG. 3 illustrates a method for upgrading an existing standard Electric Vehicle (EV) charger from V1G to Vehicle to Grid (V2G) operation in accordance with a first embodiment of the present invention.

FIG. 4 illustrates a method for upgrading an existing standard Electric Vehicle (EV) charger from V1G to Vehicle to Grid (V2G) operation in accordance with a second embodiment of the present invention.

FIG. 5 illustrates a method for upgrading an existing standard Electric Vehicle (EV) charger from V1G to Vehicle to Grid (V2G) operation in accordance with a third embodiment of the present invention.

DETAILED DESCRIPTION

Various technologies that pertain to systems and methods that facilitate an electric vehicle (EV) charger upgrading that can send power from a grid to an EV as well as from the EV to the grid. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an electric vehicle (EV) charger upgrading system and a method that can upgrade an existing standard Electric Vehicle (EV) charger from V1G to Vehicle to Grid (V2G) operation. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the electric vehicle (EV) charger upgrading system that can control bi-directional charging according to the present disclosure are described below with reference to FIGS. 1-5 herein. Like reference numerals used in the drawings identify similar or identical elements throughout the several views. The drawings are not necessarily drawn to scale.

Consistent with one embodiment of the present invention, FIG. 1 represents an electric vehicle (EV) charger upgrading system 105 for upgrading an existing standard EV charger 107 from Grid to Vehicle (V1G) 110(1) operation to Vehicle to Grid (V2G) 110(2) operation in accordance with an exemplary embodiment of the present invention. For example, the EV charger upgrading system 105 is capable of upgrading an existing standard AC Electric Vehicle (EV) charger from V1G 110(1) to Vehicle to Grid (V2G) 110(2) in order to send power from a grid 112 to an EV 115 as well as from the EV 115 to the grid 112.

The EV charger upgrading system 105 is deployed for loading the existing standard EV charger 107 initially developed to support only the V1G 110(1) operation with a V2G compatible firmware 117. The EV charger upgrading system 105 is deployed for locally configuring the existing standard EV charger 107 for the Vehicle to Grid (V2G) 110(2) operation to locally enable the existing standard EV charger 107 to allow the V2G 110(2) operation after an inspection 113 such that the existing standard EV charger 107 supports a vehicle to grid (V2G) communication interface 120 for bi-directional charging/discharging of electric vehicles (EVs). In this way, a local configuration 122 requires an authorization 125 via a cloud 127 by a cloud-based service 127(1) for conversion of the existing standard EV charger 107 from V1G 110(1) to V2G 110(2). The existing standard EV charger 107 may be a Level 2 AC charger that contains ISO15118 standard capabilities 130 to safely configure it for Vehicle to Grid (V2G) 110(2) operation.

In operation, locally configuring the existing standard EV charger 107 for Vehicle to Grid (V2G) 110(2) operation further comprises loading the existing standard EV charger 107 with an initial setting 132 that only allows V1G functionality. The locally configuring the existing standard EV charger 107 for Vehicle to Grid (V2G) 110(2) operation further comprises enabling V2G functionality by performing a configuration of maximum current 135.

Enabling the V2G 110(2) functionality further comprises providing a user input 137 via a user interface 140 to put the existing standard EV charger 107 in a setup mode 142 by power cycling the existing standard EV charger 107. The existing standard EV charger 107 may comprise a controller 145(1) and a memory 145(2) to store the setup mode 142 information. The configuration of maximum current 135 information may be stored in the memory 145(2).

Enabling the V2G 110(2) functionality further comprises, once in the setup mode 142, connecting the existing standard EV charger 107 to a computing device 147 (e.g., a phone, a tablet, a computer) that runs an installation software 150. The computing device 147 comprises a processor 152(1), communications 152(3) and a memory 152(2) that stores the installation software 150 and a Bluetooth application (APP) 155. The computing device 147 comprises a user interface (U/I) 157 to receive a user input 160. The computing device 147 may wirelessly (e.g., Bluetooth, Wi-Fi, and/or cellular) communicate with the existing standard EV charger 107 and the cloud 127.

Enabling the V2G 110(2) functionality further comprises providing the user input 160 via the user interface 157 for the installation software 150 to login into the cloud 127 where user rights 165 are confirmed. Enabling the V2G 110(2) functionality further comprises, if a user is determined to have technician rights 165(1), allowing the user to change the configuration of the existing standard EV charger 107 from V1G 110(1) to V2G 110(2) via a user input and to configure a maximum allowed reverse current after physically inspecting a location 167 in which the existing standard EV charger 107 is to be installed.

Enabling the V2G 110(2) functionality further comprises, after the local configuration 122 is performed, allowing a technician to apply a label 170 on the existing standard EV charger 107 for compliance with UL1741 standard, indicating the existing standard EV charger 107 can export energy and at which maximum current.

The existing standard EV charger 107 further comprises a bi-directional relay 172 to control the flow of current. The existing standard EV charger 107 further comprises a DIP switch 175 to limit the current. A DIP switch is a manual electric switch that is packaged with others in a group in a standard dual in-line package (DIP). Alternatively, the existing standard EV charger 107 further comprises a first DIP switch 175(1) and a second DIP switch 175(2). The first DIP switch 175(1) can configure in hardware a maximum current in one direction and the second DIP switch 175(2) can configure in hardware a maximum current in another direction. The existing standard EV charger 107 further comprises a communication interface 177 to communicate with the cloud 127, the computing device 147 and the EV 115. The communication interface 177 may support more than one suitable communication protocols such as Bluetooth, Wi-Fi and cellular.

Referring to FIG. 2, it illustrates a method 200 for upgrading the existing standard Electric Vehicle (EV) charger 107 from V1G 110(1) to Vehicle to Grid (V2G) 110(2) operation in accordance with an exemplary embodiment of the present invention. Reference is made to the elements and features described in FIG. 1. It should be appreciated that some steps are not required to be performed in any particular order, and that some steps are optional.

The method 200 comprises a step 205 of loading the existing standard EV charger 107 initially developed to support only V1G 110(1) with a V2G 110(2) compatible firmware. The method 200 further comprises a step 210 of loading the existing standard EV charger 107 with an initial setting that only allows V1G functionality. The method 200 further comprises a step 215 of enabling V2G functionality by performing a configuration of maximum current such that a local configuration requires an authorization via a cloud for conversion of the existing standard EV charger 107 from V1G to V2G. The existing standard EV charger 107 contains ISO15118 standard capabilities to safely configure it for Vehicle to Grid (V2G) operation.

Turning now to FIG. 3, it illustrates a method 300 for upgrading the existing standard Electric Vehicle (EV) charger 107 from V1G 110(1) to Vehicle to Grid (V2G) 110(2) operation in accordance with a first embodiment of the present invention. Reference is made to the elements and features described in FIG. 1. It should be appreciated that some steps are not required to be performed in any particular order, and that some steps are optional.

The method 300 comprises a step 305 of loading the existing standard EV charger 107 initially developed to support only V1G 110(1) with a V2G 110(2) compatible firmware. The method 300 further comprises a step 310 of locally configuring the existing standard EV charger 107 for Vehicle to Grid (V2G) 110(2) operation. Local configuring can be done in a step 315 via setting the DIP switch 175 to limit the current or setting the first and second DIP switches 175(1-2) to set the maximum bidirectional currents.

FIG. 4 illustrates a method 400 for upgrading the existing standard Electric Vehicle (EV) charger 107 from V1G 110(1) to Vehicle to Grid (V2G) 110(2) operation in accordance with a second embodiment of the present invention. Reference is made to the elements and features described in FIG. 1. It should be appreciated that some steps are not required to be performed in any particular order, and that some steps are optional.

The method 400 comprises a step 405 of loading the existing standard EV charger 107 initially developed to support only V1G 110(1) with a V2G 110(2) compatible firmware. The method 400 further comprises a step 410 of locally configuring the existing standard EV charger 107 for Vehicle to Grid (V2G) 110(2) operation. Local configuring can be done in a step 415 via using the Bluetooth APP 155. The Bluetooth APP 155 uses a Bluetooth interface (I/F) 155(1) in which a user input can connect a smartphone such as the computing device 147 to the existing standard EV charger 107 and then the smartphone using an Application Programming Interface (API) 159 (see FIG. 1) will configure the existing standard EV charger 107.

As seen in FIG. 5, illustrates a method 500 for upgrading the existing standard Electric Vehicle (EV) charger 107 from V1G 110(1) to Vehicle to Grid (V2G) 110(2) operation in accordance with a third embodiment of the present invention. Reference is made to the elements and features described in FIG. 1. It should be appreciated that some steps are not required to be performed in any particular order, and that some steps are optional.

The method 500 comprises a step 505 of loading the existing standard EV charger 107 initially developed to support only V1G 110(1) with a V2G 110(2) compatible firmware. The method 500 further comprises a step 510 of locally configuring the existing standard EV charger 107 for Vehicle to Grid (V2G) 110(2) operation. Local configuring can be done in a step 515 via using the cloud-based service 127(1) of the cloud 127. In this method, a user would remotely provide the local configuration assuming the right credentialing and control from onsite inspection is available.

In an alternative construction, the method for limited maximum "backfeed" of a charging station can be expanded to multiple charging stations that are feeding one single load center or a panel distribution board. In this event, the total backfeed for the plurality of charging stations is entered by the contractor via bluetooth or communicated via the cloud environment. In this case, the system dynamically ensures that the cumulative backfeed from the combination of the charging systems does not exceed the maximum rating as specified by a contractor.

While a design of a locally configuring an existing standard AC EV Level 2 charger is described here a range of one or more other EV chargers are also contemplated by the present invention. For example, other chargers such as DC EV chargers may be implemented based on one or more features presented above without deviating from the spirit of the present invention.

The order of the operations described (1$^{st}$ load the V2G compatible firmware, 2$^{nd}$ configure the unit for V1G only, 3$^{rd}$ inspect the site and configure the unit for V2G) is consistent with the assumption that the selection is done via firmware (Bluetooth local interface, or app using cloud), because the firmware can be loaded with the default of V1G only (so de facto steps 1 and 2 happen at the same time). In the case of the dip-switch implementation, the dip-switch must come pre-set to allow V1G only from the factory, because the firmware update could happen remotely at any time in the future, without the physical presence of the inspector.

The techniques described herein can be particularly useful for a V1G to a V2G upgrade. While particular embodiments are described in terms of this arrangement, the techniques described herein are not limited to such an arrangement but can also be used with other arrangements such as different EV feature upgrades.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method to upgrade an existing standard AC Electric Vehicle (EV) charger from Grid to Vehicle (V1G) functionality to Vehicle to Grid (V2G) operation in order to send power from a grid to an EV as well as from the EV to the grid, the method comprising:

loading the existing standard AC EV charger, initially developed to support only V1G, with a V2G compatible firmware after an inspection; and locally configuring the existing standard AC EV charger for Vehicle to Grid (V2G) operation to locally enable the existing standard AC EV charger to allow V2G functionality after the inspection such that the existing standard AC EV charger supports a vehicle to grid (V2G) communication interface for bi-directional charging/discharging of electric vehicles (EVs), and wherein a local configuration requires an authorization via a cloud for enabling V2G functionality after the inspection for conversion of the existing standard AC EV charger from V1G to V2G.

2. The method of claim 1, wherein the existing standard AC EV charger is a Level 2 charger that contains ISO15118 standard capabilities to safely configure the existing standard AC EV charger for Vehicle to Grid (V2G) operation.

3. The method of claim 1, wherein locally configuring the existing standard AC EV charger for Vehicle to Grid (V2G) operation further comprises:

loading the existing standard AC EV charger with an initial setting that only allows V1G functionality.

4. The method of claim 3, wherein locally configuring the existing standard AC EV charger for Vehicle to Grid (V2G) operation further comprises:

enabling V2G functionality by performing a configuration of maximum current.

5. The method of claim 4, wherein enabling the V2G functionality further comprises:

providing a user input via a user interface to put the existing standard AC EV charger in a setup mode by power cycling the existing standard AC EV charger.

6. The method of claim 5, wherein enabling the V2G functionality further comprises:

once in the setup mode, connecting the existing standard AC EV charger to a computing device that runs an installation software.

7. The method of claim 6, wherein enabling the V2G functionality further comprises:

providing a user input via the user interface for the installation software to login into the cloud where user rights are confirmed.

8. The method of claim 7, wherein enabling the V2G functionality further comprises:

after physically inspecting a location in which the existing standard AC EV charger is to be installed, for a user determined to have technician rights, allowing the user to change the configuration of the existing standard AC EV charger initially developed to support only V1G functionality from V1G to V2G via a user input for upgrading the existing V1G-only charger to V2G capability and to configure a maximum allowed reversed current.

9. The method of claim 8, wherein enabling the V2G functionality further comprises:

after the local configuration is performed, allowing the technician to apply a label on the existing standard AC EV charger for compliance with UL1741 standard, indicating the existing standard AC EV charger is able to export energy and at which maximum current.

10. The method of claim 9, wherein the existing standard AC EV charger is a Level 2 charger that contains ISO15118 standard capabilities to safely configure the existing standard AC EV charger for Vehicle to Grid (V2G) operation.

11. A method to upgrade an existing standard Electric Vehicle (EV) charger to receive power from a grid as well as to send power from the EV to the grid, the method comprising:

loading the existing standard EV charger initially developed to support only a grid to an EV charging with the EV to the grid charging compatible firmware after an inspection; and locally configuring the existing standard EV charger for the EV to the grid charging operation to locally enable the existing standard EV charger to allow the EV to the grid charging after the inspection such that the existing standard EV charger supports an EV to the grid charging communication interface for bi-directional charging/discharging of electric vehicles (EVs), and wherein a local configuration requires either an authorization via a cloud for enabling the EV to the grid charging after the inspection or configuring via a computing device having a Bluetooth application (APP) or setting of one or more DIP switches for conversion of the existing standard EV charger from the grid to the EV as well as from the EV to the grid.

12. The method of claim 11, wherein the existing standard EV charger is an AC Level 2 charger that contains ISO15118 standard capabilities to safely configure the existing standard EV charger for Vehicle to Grid (V2G) operation.

13. The method of claim 11, wherein locally configuring the existing standard EV charger further comprises:

loading the existing standard EV charger with an initial setting that only allows the grid to the EV functionality.

14. The method of claim 13, wherein locally configuring the existing standard EV charger further comprises:

enabling Vehicle to Grid (V2G) functionality by performing a configuration of maximum current.

15. The method of claim 14, wherein enabling the V2G functionality further comprises:

providing a user input via a user interface to put the existing standard EV charger in a setup mode by power cycling the existing standard EV charger;

once in the setup mode, connecting the existing standard EV charger to a computing device that runs an installation software;

providing a user input via the user interface for the installation software to login into the cloud where user rights are confirmed;

allowing the user to change the configuration of the existing standard EV charger from V1G to V2G via a user input and to configure a maximum allowed reverse current after physically inspecting a location in which the existing standard EV charger is to be installed; and after the local configuration is performed, allowing a technician to apply a label on the existing standard EV charger for compliance with UL1741 standard, indicating the existing standard EV charger is able to export energy and at which maximum current.

* * * * *